United States Patent [19]
Ford et al.

[11] Patent Number: 5,213,737
[45] Date of Patent: May 25, 1993

[54] EXTRUSION METHOD AND APPARATUS FOR PRODUCING A BODY FROM POWDER MATERIAL

[75] Inventors: Clarence E. Ford, Painted Post; Donald L. Guile, Horseheads, both of N.Y.; Lucretia R. Quatrini, Sayre, Pa.

[73] Assignee: Corning Incorporated, Corning, N.Y.

[21] Appl. No.: 801,361

[22] Filed: Dec. 2, 1991

[51] Int. Cl.$^5$ .............................................. B29C 47/36
[52] U.S. Cl. ..................................... 264/109; 419/67; 425/204
[58] Field of Search ................... 264/63, 109; 425/200, 425/203, 204; 419/67, 41

[56] References Cited
U.S. PATENT DOCUMENTS 4,501,498 2/1985 McKelvey .......................... 425/204
4,632,564 12/1986 Kopernicky .......................... 425/203
4,813,863 3/1989 Hahn et al. .......................... 425/205
4,890,996 1/1990 Shimizu .............................. 425/204

Primary Examiner—Mary Lynn Theisen
Attorney, Agent, or Firm—L. Rita Quatrini

[57] ABSTRACT

An improvement in a method and apparatus is provided in extruding a powder material to form an article, in which the material is passed through an extruder and then through a die, wherein the material is provided in the form of a mixture which includes a vehicle, the improvement comprising having one or more gear pumps in succession between the extruder and the die, so that the powder material passes through the gear pump(s) after it leaves the extruder and before it enters the die. The gear pump(s) can have one or more pair of gears which are arranged sequentially with respect to the flow of the material.

20 Claims, 3 Drawing Sheets

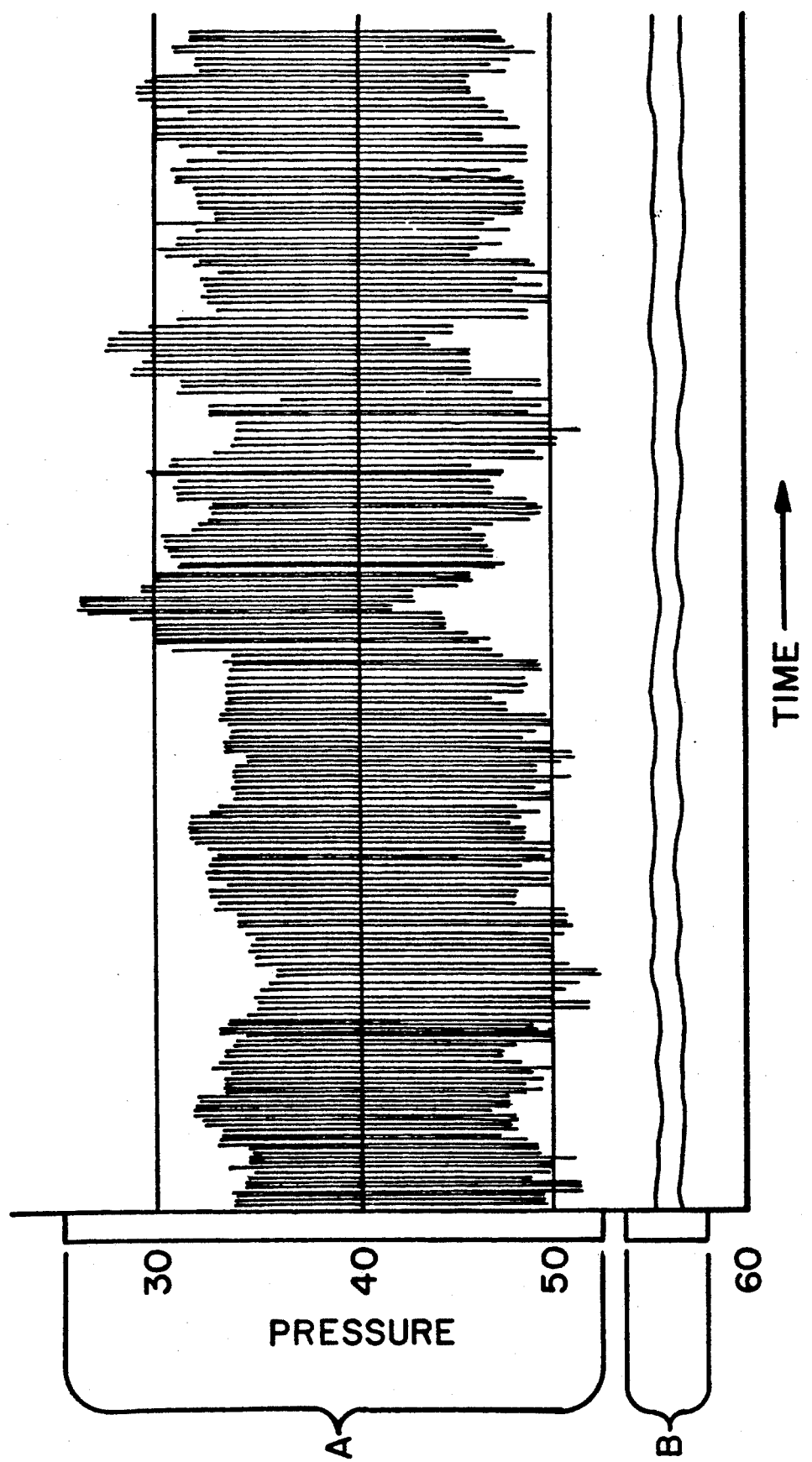

EXTRUSION METHOD AND APPARATUS FOR PRODUCING A BODY FROM POWDER MATERIAL

CROSS REFERENCE TO RELATED APPLICATION

This application is related to application U.S. patent Application Ser. No. 07/801661, entitled "Gear Pump Having Multiple Pairs of Gears", which is being filed concurrently herewith.

BACKGROUND OF THE INVENTION

This invention relates to an improvement in a method for extruding a powder material to produce an article. The method includes the steps of passing the material in the form of a mixture which includes a vehicle, through an extruder and then through a die, with the improvement being the step of passing the material through a gear pump before the material enters the die. The term gear pump as used in the present invention can refer to a gear pump having one or more pair of gears in succession in a housing; or it can refer to more than one gear pump arranged in succession. Use of the gear pump helps to stabilize and control the extrusion process. Use of a gear pump allows a high pressure differential to be created in the material from input end to the output end of the gear pump. Therefore highly filled systems can be extruded smoothly to form uniform high quality products.

In the extrusion of filled systems of powder material, such as those used for catalyst supports, for example, ceramic honeycombs, considerable pressure is required in order to force the material through the extrusion die. At present, this is achieved with a hydraulic ram extrusion press, or a two stage de-airing single auger extruder, or in a twin screw mixer with a die assembly attached to the discharge end. In the latter, the proper screw elements are chosen according to material and other process conditions in order to build up sufficient pressure to force the batch material through the die.

There are disadvantages associated with these pressure creating devices especially in extrusion of ceramic materials. For example, in the case of the ram extruder, the process is an intermittant one and there is no means to remove any inhomogenieties in the materials. Also upon the reloading of the extruder with a new charge of material, an interface is formed between the remaining materials and the new charge. This can and does create defects in the material. In the case of a single screw extruder, the material moves in plug flow, and where it is in contact with the screw and walls of the extruder, the material sees considerable shear. If a die is attached directly to the single screw, the material due to rheology differences will extrude differently across the face of the die. In a twin screw mixer used as an extruder, this effect will be decreased. However, in both types of extruder there will be a pulsation in pressure due to the batch coming off the screws. This pulsation affects the quality of the extruded piece. In the case of a single screw extruder, it is difficult to generate high pressure needed to extrude thin walled cellular structures. The twin screw mixer can generate the required pressures but the high pressure results in considerable wear of the screw elements and barrel walls. Also the work input required to generate the pressure in the twin screw mixer increases the batch temperature which changes the extrusion characteristics of the batch. In an effort to overcome screw memory and pulsation, an orifice is often used between the extruder and die. While this can be effective, it requires an increase in pressure from the extruder and does not remove the pulsation from the screw tips.

It would be advantageous therefore, to have an improvement in an extrusion process for powder material in which high pressures are easily generated, and at the same time, in which the above described disadvantages are eliminated and extrusion conditions are stabilized and controlled to consistently produce high quality products, for example, honeycombs.

SUMMARY OF THE INVENTION

In accordance with one aspect of the invention, there is provided an improvement in a method of extruding a powder material to form an article, which method includes the steps of passing the material through an extruder and then passing the material through a die, the material being provided in the form of a mixture which includes a vehicle, the improvement comprising the step of passing the material through one gear pump after the material leaves the extruder and before it enters the die. The gear pump can have one or more pair of gears. If there is more than one pair of gears, the gear pairs are arranged adjacent to one another sequentially with respect to the flow of the material.

The material can be passed through one or more additional gear pumps in succession before entering the die. Each additional gear pump can have one or more pairs of gears.

In accordance with another aspect of the invention, there is provided an improvement in an apparatus suitable for extruding a powder material to form an article which apparatus includes an extruder and a die wherein the powder material passes through the extruder and then through the die, the material being provided in the form of a mixture which includes a vehicle, the improvement which comprises having one gear pump between the extruder and the die, whereby the powder material passes through the gear pump after it leaves the extruder and before it enters the die. The gear pump can have one or more pair of gears. When there are more than one pair of gears, they are arranged sequentially with respect to the flow of the material.

The apparatus can have one or more additional gear pumps in succession through which the material passes before it enters the die.

BRIEF DESCRIPTION OF THE FIGURES

FIG. 3 is a graph showing pressure fluctuations with time before and after a material is passed through a gear pump in an extrusion process for plasticized ceramic powder.

DETAILED DESCRIPTION OF THE INVENTION

Figure 1:
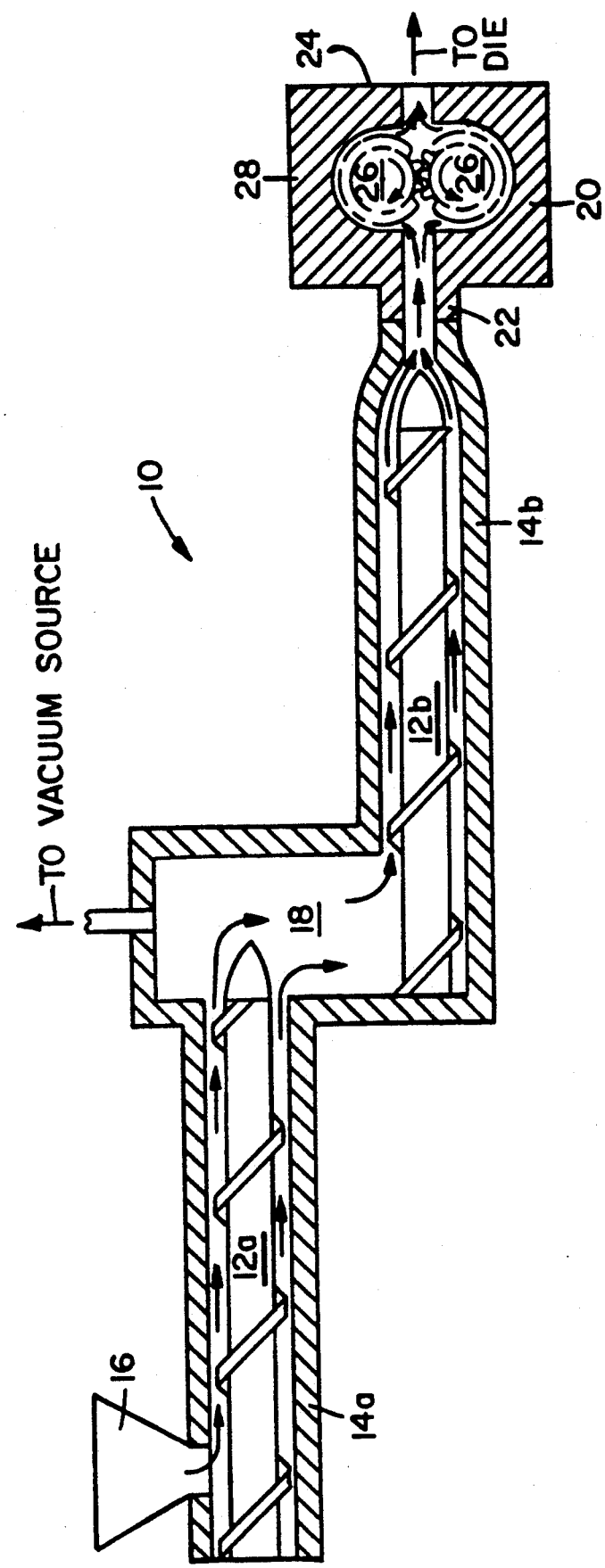
FIG. 1 is a diagram showing the arrangement of a typical two stage single screw extruder with respect to a gear pump in the practice of the present invention.

The present invention provides an improvement in a method of extruding a powder material, the method being passing the material through an extruder and then through a die to form an article or body. The material is provided in the form of a mixture which includes a vehicle. The improvement lies in having a gear pump situated between the extruder and the die so that the material passes through the gear pump after it leaves the extruder and before it enters the die. There can be one gear pump. In this case, the material passes from the extruder through the gear pump to the die. There can be more than one gear pump. If more than one gear pumps are used, they are arranged sequentially with respect to one another so that material passes successively through each gear pump.

The improvement offers the advantages of a stabilized and controlled process for continuously extruding powder material. The gear pump allows high pressures to be built up in the material so that the extrusion is carried out smoothly without pulsations. Products of uniform size and shape, can be produced as evidenced by continuous or uniform cross sections within the body. These improvements are evident even in complex shapes such as honeycombs. Up to this time a gear pump has not been used in the extrusion of highly filled powder mixtures as in the present invention. Extrusions can be carried out at lower temperatures and reduced thermal gradients within the batch as it approaches the die, than in processes without the gear pump. The temperature of the material throughout the extrusion operation is below the gel point of the vehicle/binder system in the powder mixture.

In the powder/vehicle mixture, the powder materials must be relatively insoluble in the vehicle. The typical powder materials are ceramic material, glass, glass ceramic material, metal, metal-alloy, cermet, elemental carbon, organic material, and combinations thereof. One example of a metal or metal/alloy type of mixture, although it is to be understood that the invention is not limited to such, is a mixture of Fe, Cr, and Al metal and/or metal alloy powders with various additions such as other metals, alloys, or oxides, etc. Honeycombs are a typical shape extruded from this type of mixture. Ceramic materials are especially suited to the practice of the present invention. Ceramic material according to the present invention includes, in addition to ceramics, the raw materials which form ceramics on firing.

The vehicle can be any material that will form a wet mixture, such as water, or suitable organics. A plasticizer can be chosen from a number of organic materials depending on the application.

For example, with ceramic powders, a suitable plasticizer is methylcellulose or polyvinylalcohol. Other extrusion aids such as deflocculants, lubricants, wetting agents, etc. can be present if necessary depending on the mixture composition. So typical mixture compositions are combinations of clays, talcs, aluminas, mullite, such that when reacted form cordierite. These mixtures are highly filled.

According to the practice of the present invention, by highly filled is meant a high solid to liquid content in the mixture. For example, the powder material content in the mixture is typically at least about 45% by volume, and most typically at least about 50% by volume.

Some examples of highly filled mixtures having the composition for a cordierite forming batch are about 100 weight parts of powder to about 30 weight parts of water or about 77% by weight powder, and about 23% by weight water. The powder specific gravity for this composition is about 2.5 on the average. In terms of volume, the typical composition is about 30 parts by volume powder and about 23 parts by volume water or about 57% by volume powder and about 43% by volume water.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide. The components are supplied typically, but not exclusively, as clay and talc and alumina, such as Georgia Kaolin Hydrite MP raw clay, Georgia Kaolin Glomax LL calcined clay, Pfizer talc, and Alcan C-701 alumina. This composition is dryblended with a methylcellulose such as Dow A4M Methocel ® and a surfactant (wetting agent) such as sodium stearate. It is preferred that the powder material be fine powder (in contrast to coarse grained materials) some components of which can either impart plasticity, such as clays, when mixed with a vehicle such as water, or which when combined with organic materials such as methylcellulose or polyvinylalcohol can contribute to plasticity. Typically with this type of composition, the bulk of the cordierite-forming powder components falls in the range of about 1 micrometer to about 15 micrometers in diameter, with the clays containing a fraction less than about 1 micrometer in diameter, and the alumina and talc having some particles greater than about 15 micrometers in diameter. The powders can be synthetically produced materials such as oxides, hydroxides, etc, or they can be naturally occurring minerals such as clays, talcs, or any combination of these. Of particular interest for the present invention are materials which can be extruded in the form of cellular structures or honeycombs, and which produce a cordierite body upon firing.

If metal or metal alloy mixtures are used as described above, it is advantageous to include a binder such as methylcellulose or polyvinylalcohol. It is especially advantageous to include an aid to prevent oxidation, such as organic acids, for example oleic acid. Water is typically used as the vehicle.

The improvement afforded by the present invention results in improved dimensional control in a body having a constant cross section when cut perpendicular to the extrusion direction. The bodies according to the present invention can have any convenient size and shape. However, the process is especially suited to production of cellular bodies such as honeycombs, especially cordierite honeycombs. Cellular ceramics find use in a number of applications such as catalyst carriers, filters such as diesel particulate filters, molten metal filters, regenerator cores, etc. Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). These bodies are made preferably of, but not limited, to materials which when fired form cordierite. Typical wall thicknesses in catalytic converter applications, for example, are about 6 mils (about 0.15 mm) for 400 cells/in$^2$ (62 cells/cm$^2$) honeycombs. Web thicknesses range typically from about 4 to about 25 mils (about 0.1 to about 0.6 mm). The external size and shape of the body is controlled by the application, e.g. engine size and space available for mounting, etc.

Once the desired mixture composition is made up, it is subjected to a series of operations to plasticize and pressurize it to a first pressure. The first pressure is sufficient to fill the gear teeth on the inlet end of the gear pump (or inlet end of the first gear pump if more than one are used). The first pressure can vary depending on the type of material and the type of product that is to extruded. For example, for extrusion of ceramic materials to form honeycombs, the typical first pressures are about 300 to about 1000 psi.

The plasticizing and first pressurizing can be done in several ways. In general, any type of device which can de-air the mixture and provide typically up to about 500 psi is suitable. Some suitable ways of first pressurizing will now be described, although the invention is not limited to these.

In accordance with one embodiment, the mixture is homogenized and plasticized in a muller type of mixer or a double arm mixer. The plasticized material is then fed through a two stage single screw de-airing extruder which is commonly called a "single screw extruder". FIG. 1 shows the arrangement of a typical two stage single screw extruder with respect to a gear pump in the practice of the present invention. Each stage of the single screw extruder (10) is comprised of an auger screw (12a) and (12b) in a barrel (14a) and (14b). The plasticized mixture is introduced into the extruder through a device such as a hopper (16). In the first stage of the extruder, the mixture is picked up by auger screw (12a) and compacted in barrel (14a) as it moves toward the discharge end of the barrel, thus forming a vacuum seal. The direction of the material from introduction to the extruder to entrance to the die is shown by the arrows. The mixture is then shredded or noodled in a shredder (not shown) as it enters a vacuum de-airing chamber (18) to remove any trapped air within the mixture. The de-aired mixture drops to the bottom of the de-airing chamber where it is picked up by the second stage screw (12b). This compacts the material in barrel (14b) and builds up necessary pressure for the input to the gear pump (20). As a result of passage through the two stage single screw extruder, the mixture is compacted, shredded, de-aired, compacted, and then pressurized to a first pressure.

Figure 2:
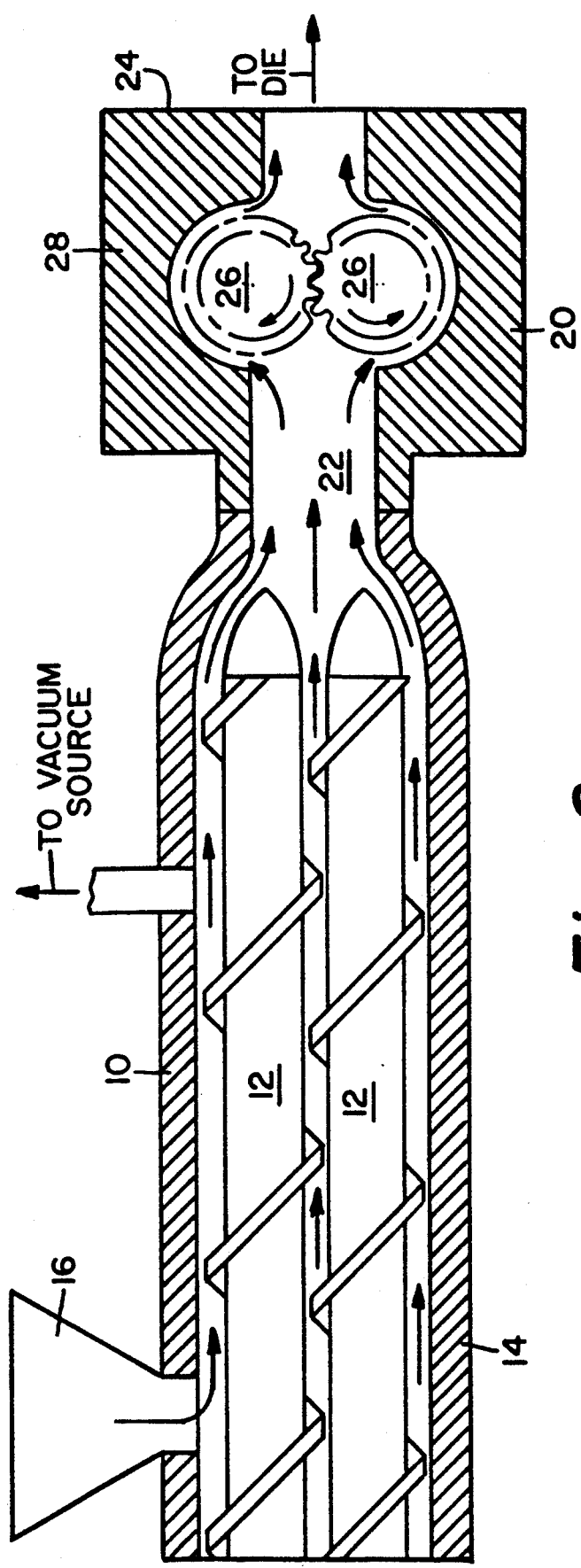
FIG. 2 is a diagram showing the arrangement of a typical twin screw extruder with respect to a gear pump in the practice of the present invention.

In accordance with another embodiment, the mixture is homogenized, plasticized, de-aired, and first pressurized in a twin screw mixer which in this embodiment, functions as the extruder. FIG. 2 shows the arrangement of a typical twin screw extruder with respect to a gear pump in the practice of the present invention. The twin screw mixer (10) comprises two parallel screws (12) in a barrel (14). The screws can be co-rotating or counter-rotating, intermeshing or non-meshing, although it is the usual practice to have co-rotating intermeshing screws. The mixture enters the twin screw mixer through a device such as a hopper (16) and is picked up by the screws. The direction of the material flow is shown by the arrows. The twin screw mixer provides the first pressure to the input side of the gear pump (20) if one gear pump is used as shown in FIG. 2, or the input side of the first gear pump if more than one are used.

In accordance with another embodiment, the mixture is homogenized, plasticized, de-aired, and first pressurized by being passed first through a twin screw mixer and thereafter through a single stage single screw extruder to achieve the first pressure. On the input end of the single screw extruder where material is transferred from the twin screw mixer, a vacuum is drawn to remove any entrapped air and then the material is transferred along the barrel of the single screw extruder where it is compacted and pressurized and fed to the gear pump. For the purposes of the present invention, this arrangement of single screw and twin screw mixers and chambers is considered the extruder.

The first pressurized mixture is then passed through the gear pump for the purpose of insuring homogeneity and uniform viscosity in the mixture while it is being transported to the extrusion die. The typical arrangement of a gear pump is shown in FIGS. 1 and 2. The gear pump has an inlet end (22) and an outlet end (24), and comprises at least one pair of intermeshing gears (26) (part of the gears are shown with teeth). The gears are counter-rotating with respect to one another and are enclosed in a housing (28). The inside of the housing defines the path of material flow through the gear pump. It is preferred that part of the inside of the housing is configured in the shape of at least part of the non-meshing portion of the gears. It is preferred that there be a very close tolerance between this part of the inner surface and the non-meshing part of the gears to prevent back-flow of the material. The first pressurized mixture enters the gear pump through the inlet end of the housing and is fed into the spaces between the gear teeth. The material is picked up in the spaces between the gear teeth, and is carried by the counter-rotating motion of the gears through the housing to the discharge side where it is forced out as the gears mesh together. Passage of the material through the gear pump as described above, results in generation of the second pressure (the extrusion pressure) which is the pressure required to push the material through the extrusion die.

As the material passes between the spaces of the gear teeth on each gear on the inlet end, it separates. The counter-rotating motion of the pair of gears forces the material through the gear pump to the outlet end. The mixture is recombined at the outlet end, thus helping to homogenize the material and to remove any memory due to the screws of the feeding devices, and to remove pressure pulsations from the screws while increasing the material pressure to the extrusion pressure. As with the first pressure, the extrusion pressure depends on factors such as the type of material and the type of product that is to be extruded, and also on the type of extrusion die that is used. For example, for simple shapes with thick sections, it may be about a few hundred psi. For extrusion of ceramic materials to form honeycombs, the typical second pressures can be about 750 to about 2500 psi or more depending mainly on web thickness. Gear pumps having one pair of gears are commercially available. One typical gear pump is Model No. 110x manufactured by Normag corporation. The intermeshing gears and their housing form what is called a positive displacement gear pump which is capable of generating the required pressure for extrusion. As the material passes from the inlet end to the outlet end, it is displaced as the gear teeth mesh back together. The pressure is created by the fact that where the gear teeth come together, the material is being squeezed out. On the inlet side as the gear teeth open, a void or vacuum is created causing material to be sucked into the spaces between the gear teeth. A modest or low pressure (the first pressure) on this side helps fill the spaces between the gear teeth. The material is then carried through the gear pump and constrained by the close tolerance between the inner surface of the housing and the non-meshing gear portion to prevent back flow. The gears are driven by a variable speed drive motor. This gives a pumping capacity range for any gear pump. The volume which can be pumped is approximately linear with the gear speed. The output pressure is more a result of the type of die used or anything which constricts flow. Therefore, for any gear speed, the pressure can vary for different types of dies. Also if the gear pump is run at different speeds for a given die, the pressure varies since it takes more pressure to push material through the die at a faster rate. The amount of material pumped for a given gear speed remains relatively constant regardless of the first pressure on the input side of the gear pump. This is why it is called a positive displacement pump.

When a twin screw extruder is used, the profile of the twin screws can be altered to improve mixing, rather than to create pressure, since the twin screw is not required to generate the second pressure (extrusion pressure) as it is when a gear pump is not used. This then requires less energy input to the twin screw extruder, and thus into the material, resulting in lower material temperature.

The gear pump can be run at variable speeds depending on the rheology of the material, in order to optimize the quality of the extruded article.

FIG. 3 is a graph showing pressure fluctuations with time in material before and after it passes through the gear pump. Section A of the graph shows the pressure fluctuations as the material leaves the extruder which in this case is a twin screw extruder. Prior to the improvement of the present invention, this material would pass directly to the extrusion die. The wide fluctuations in the pressure have resulted in inhomogeneities in the extruded articles, as was described previously. Section B shows the pressure fluctuations in the material after it passes through the gear pump prior to entering the extrusion die. The two pressure plots, A and B, shown in this figure were taken simultaneously during operation of the gear pump with a twin screw mixer and attached die. It can be seen that there are no significant pressure fluctuations in the material. The effect that this has on the extruded product is very positive as far as producing a product of uniform dimensions.

In accordance with one embodiment of the present invention, there can be more than one gear pump(s) positioned in series so that the mixture can pass through the inlet and outlet ends of each one in succession and finally to the extrusion die.

In accordance with another embodiment, each gear pump can have more than one pairs of gears. The pairs are in succession within the respective housing, so that, the material passes within the spaces between the gear teeth over one pair and thereafter within the spaces between the gear teeth over the next successive pair. The advantage of having the multiple pairs in one housing as opposed to being in separate housings is that there is less hardware required with one housing. In a gear pump with multiple pairs of gears, a pressure monitoring device such as a transducer is placed between the adjacent gear pairs to monitor pressure at that point. Each gear pair is mounted separately so that the speed of each pair can be adjusted separately.

The gear pairs can be arranged in the same plane (co-planar). They can be rotated with respect to one, most typically at 90° angles with respect to one another.

The advantage of having the pairs rotated with respect to one another is to further enhance homogenization and reduction in batch memory due to the feeding screws of the extruder.

The invention is not limited to the number of gear pumps that can be used, or to the number of pairs of gears that are part of each gear pump or to the spacial orientation of the respective gear pairs. Any number of gear pumps having any appropriate number of gear pairs in any orientation can be used depending on the application.

One advantage of having more than one pair of gears is that when two or more pairs of gears are placed in series, either as separate gear pumps or placed in the same housing, the differential pressure between the initial input to the output which provides the extrusion pressure is divided between the gear pairs. As an illustration, if, for example, the input pressure to the gear pump (first pressure) is about 500 psi and the extrusion pressure (second pressure) is about 2500 psi, the pressure differential is about 2000 psi. With two gear pairs in series, the pressure differential for each gear pair can be distributed over the gear pairs. Therefore higher pressures can be attained with multiple gear pairs. This results in more overall flexibility in operating the extrusion process.

The invention is not limited to the types of gear teeth configurations. Most typically, however, the gear teeth are helical, spur, or herringbone. While any type of gear teeth design will work in the practice of the present invention, helical gear teeth discharge the mixture continuously since as the gear teeth come together, material is forced out of each segment starting at one end where each tooth first meshes with teeth on the other gear and progressing across the gear to the other end as the gears rotate. When one segment is nearly closed, (done providing material) the next segment is starting to close. This results in a smooth continuous flow of material.

With a given pair of gears, the type of gear teeth must be the same to insure that they intermesh. However, gear pairs can differ from one to the other as far as the type of gear teeth. From a practical standpoint however, it is normal practice that all the gears have the same type of teeth.

The second pressurized mixture is then extruded through a die to form a green body. The die can have any configuration depending on the desired shape of the body. For example, one desired shape is that of a honeycomb, and any die used for extrusion of honeycombs can be used.

The green body can then be dried and sintered by known processes to densify it and to react the mixture components to form the desired product.

To more fully illustrate the invention, the following non-limiting examples are presented. All parts, portions, and percentages are by weight unless otherwise stated.

EXAMPLE 1

The following is an example of a procedure for processing a powder mixture using a gear pump in conjunction with a twin screw mixer as the extruder, and a die to produce a ceramic honeycomb structure as the article. The structure is used typically as a substrate for catalysts.

The mixture is made of ceramic raw materials, extrusion aids, and water such that once formed into the honeycomb shape, and fired, will form cordierite.

The powder mixture is made up in the following parts: about 41 of talc, (Pfizer talc 95-97), about 15 of kaolin, (Georgia Kaolin Hydrite MP), about 26-27 of calcined kaolin, (Georgia Kaolin Glomax LL) about 15 of alumina, (Alcan alumina C-701), about 2 of silica, (Imsil Silica A-25), about 3 of methylcellulose (Dow Methocel ®) as binder, about 0.5 of sodium stearate as wetting agent, and about 30 of water, preferably deionized water. The composition can vary somewhat depending on the desired properties, for example, rheological properties. These components are then dry blended in a mixer such as a Littleford blender to provide a homogeneous mix. The water is then added by spraying it rapidly into the blender to disperse it uniformly. The time for addition of the water is short, (about 2 minutes) to prevent the damp mixture from beginning to compact and plasticize. At this point, the mixture is in the form of a damp powder. The mixture is then fed at a constant rate into a twin screw mixer, in this case, the screws are co-rotating and intermeshing. The twin screw mixer receives the mixture, mixes it and plasticizes it as the mixture is moved by the screws. The mixture is compacted to form a vacuum seal, de-aired in a vent zone, worked again, recompacted and then exits to the gear pump. The output pressure from the twin screw mixer is in the range of about 300-500 psi which is sufficient to fill the spaces between the gear teeth on the input side of the gear pump. The gear teeth are helical, and the gears are counter-rotating and intermeshing. The output from the gear pump is then passed through a transition zone to a die which forms the desired cellular structure as the material passes through it. The gear pump develops the necessary pressure required to extrude the mixture through the die. In this case, the pressure is about 2000-2500 psi. The extruded shape is a cellular (honeycomb) structure with about 400 cells/in$^2$, (about 62 cells/cm$^2$). The properties of the formed and fired shape, such as porosity, strength and thermal expansion, are essentially the same as those of a similar product produced using more traditional processes such as ram or augur type extruders or the twin screw mixer by itself without a gear pump. When a gear pump is used according to the present invention, the product does not exhibit the effects of memory from the auger screw or from the twin screws of the twin screw mixer-feeder when they are used as pressure generating devices in the absence of a gear pump. Physical dimensions are more uniform. Extrusion defects such as swollen webs, cracks, or fissures are drastically reduced.

EXAMPLE 2

The procedure of Example 1 is carried out with the gear teeth being the spur-type. Benefits as described in Example 1 are realized.

From the above examples, it is concluded that a gear pump can be used without any deleterious effect on the properties of the article while removing some of the common extrusion problems, that is, inhomogeneities in the structure of the product within the product itself and from product to product, which results from non-homogeneous material being fed to the die.

EXAMPLE 3

In another approach, the gear pump is used at the exit end of a two stage, single screw extruder where the extruder is used to compact and de-air the material before it enters the gear pump. The mixture is plasticized prior to entering the two stage extruder using a double arm mixer or a muller type mixer The material exits the extruder at a low but sufficient pressure to feed the gear pump. From there it is forced through a die as in the previous examples.

EXAMPLE 4

The procedure of Example 1 is carried out except that the material is allowed to pass through two gear pumps in turn. The gear speeds are adjusted so that the pressure is successively built up to reach the required extrusion pressure to form the article.

EXAMPLE 5

The procedure of Example 1 is carried out except that the material passes through one gear pump having two pair of gears. The gear speeds are adjusted so that the pressure is built up to reach the required extrusion pressure to form the article.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. In the method of extruding a powder material to form an article, which method includes the steps of passing said material through an extruder and then passing said material through a die, wherein said powder material is provided in the form of a mixture which includes a vehicle, the improvement which comprises the step of passing said material through one gear pump after said material leaves said extruder and before it enters said die, said one gear pump having one or more pair of gears, wherein when said one gear pump has more than one pair of gears, said gear pairs are arranged sequentially with respect to the flow of said material.

2. A method of claim 1 wherein said one gear pump has one pair of gears.

3. A method of claim 1 wherein said one gear pump has more than one pair of gears.

4. A method of claim 3 wherein said one gear pump has two pair of gears.

5. A method of claim 1 comprising the additional step of passing said material through at least one additional gear pump after said material leaves said one gear pump and before it enters said die, said at least one additional gear pump having one or more pair of gears, wherein when said at least one additional gear pump has more than one pair of gears, said gear pairs are arranged sequentially with respect to the flow of said material.

6. A method of claim 5 wherein said at least one additional gear pump has one pair of gears.

7. A method of claim 5 wherein said at least one additional gear pump has more than one pair of gears.

8. A method of claim 7 wherein said at least one additional gear pump has two pair of gears.

9. A method of claim 1 wherein said powder material is selected from the group consisting of ceramic material, glass, glass ceramic material, metal, metal-alloy, cermet, elemental carbon, organic material, and combinations thereof.

10. A method of claim 9 wherein said powder material is ceramic material.

11. A method of claim 10 wherein said ceramic material has a composition consisting essentially of in percent by weight about 33 to about 41 aluminum oxide, about 46 to about 53 silica, and about 11 to about 17 magnesium oxide.

12. A method of claim 1 wherein said powder material content in said mixture is at least about 45% by volume.

13. A method of claim 12 wherein said powder material content in said mixture is at least about 50% by volume.

14. A method of claim 1 wherein said gears have teeth configurations selected from the group consisting of spur, helix and herringbone.

15. A method of claim 14 wherein said gear teeth have a helix configuration.

16. A method of claim 1 wherein said article has a honeycomb structure.

17. In an apparatus suitable for extruding a powder material to form an article, which apparatus includes an extruder and a die, wherein said powder material passes through said extruder and then through said die, and wherein said powder material is provided in the form of a mixture which includes a vehicle, the improvement which comprises having one more gear pumps between said extruder and said die, whereby said powder material passes through said one or more gear pumps after it leaves said extruder and before it enters said die, wherein when there is one gear pump, said one gear pump has more than one pair of gears.

18. An apparatus of claim 17 wherein said one gear pump has two pair of gears.

19. An apparatus of claim 17 wherein said gears have teeth configurations selected from the group consisting of spur, helix and herringbone.

20. An apparatus of claim 19 wherein said gear teeth have a helix configuration.

* * * * *